J. F. WIXOM.
RAKE.
APPLICATION FILED FEB. 25, 1914.
1,131,887. Patented Mar. 16, 1915.
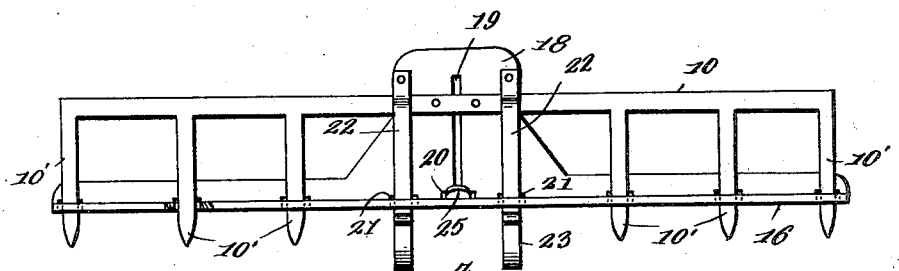
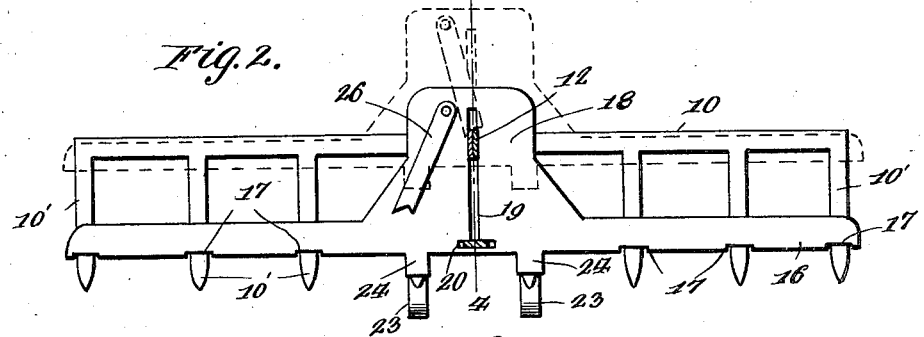
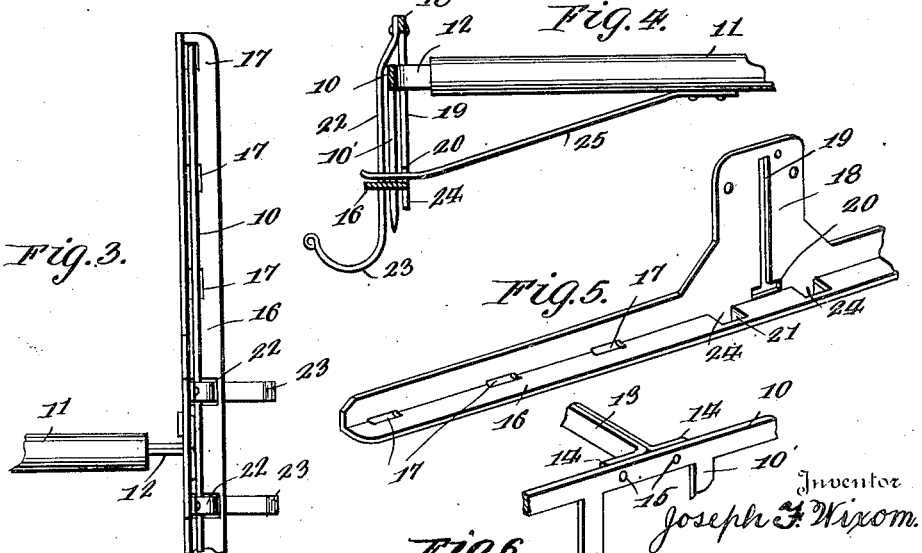
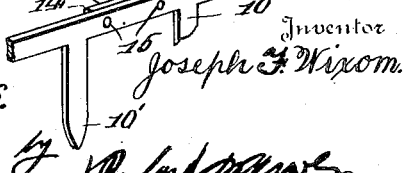
Witnesses
Guy M. Spring
Ross J. Woodward
Inventor
Joseph F. Wixom
by
his Attorney

UNITED STATES PATENT OFFICE.

JOSEPH F. WIXOM, OF HAMMONDSPORT, NEW YORK.

RAKE.

1,131,887.  Specification of Letters Patent.  Patented Mar. 16, 1915.

Application filed February 25, 1914. Serial No. 820,996.

*To all whom it may concern:*

Be it known that I, JOSEPH F. WIXOM, a citizen of the United States, residing at Hammondsport, in the county of Steuben and State of New York, have invented certain new and useful Improvements in Rakes, of which the following is a specification.

This invention relates to a rake, and the principal object of the invention is to provide an attachment for a rake which will clean the teeth of the rake so that grass will not collect upon the teeth.

Another object of the invention is to so construct this cleaning attachment that it will be normally held in an extended position, means being provided for permitting the cleaning attachment to move longitudinally upon the teeth when the rake is in use, thus preventing the attachment from interfering with the operation of the rake.

Another object of the invention is to provide an attachment which is so constructed that it will not readily get out of order when in use.

Another object of the invention is to provide an attachment which is so constructed that a latch may be connected with the attachment for releasably holding the attachment in an inoperative position.

This invention is illustrated in the accompanying drawings wherein—

Figure 1 is a front elevation of a rake provided with the improved attachment; Fig. 2 is a view of an elevation looking at the inner face of the rake head, the shank and spring being shown in section. Fig. 3 is a top plan view of the rake head; Fig. 4 is a sectional view taken along the line 4—4 of Fig. 2; Fig. 5 is a perspective view of the frame of the cleaner attachment; Fig. 6 is a perspective view of the rake head.

The rake head 10 which is provided with the usual teeth 10′ is provided with a shank 12 which extends into the handle 11 to connect the rake head with the handle. The shank is formed of two strips 13 which have their outer end portions bent to form feet 14 secured to the rake head 10 by means of rivets 15.

The cleaning attachment has its body portion 16 formed of angle bar construction, openings 17 being formed in the end portions so that the rake teeth may pass through the cleaning attachment. The central portion of the cleaner attachment is provided with a tongue 18 which extends above the body portion and is provided with a vertically-extending slot 19, lower end portion 20 of which is enlarged transversely. Openings 21 are formed in the body portion upon opposite sides of the slot 19 to permit the passage of strips 22 which have their upper ends secured to the upper end portions of the tongue 18 and have their lower end portions bent to form abutments 23.

In order to prevent the central teeth of the rake from being bent when the rake is in use, tongues 24 have been provided, which tongues may serve to assist in removing grass from the central teeth.

When assembling this rake, the shank 12 is passed through the slit 19 into the handle 11 and the free end of the leaf spring 25 is passed through the enlarged end 20 of the slot 19. The rake teeth pass through the openings 17 and behind the strips 22, and it will thus be seen that when the rake is used, the cleaner attachment may move longitudinally upon the teeth and remove the grass which may stick to the teeth. By having the head of the rake passed between the strips 22 and tongue 18, the cleaning attachment will be prevented from having undue pivotal movement upon the teeth which might tend to open the teeth. A latch 26 has been provided so that the cleaning attachment may be moved to a raised position and releasably held in this raised position by moving the free end of the latch into engagement with the shank 12.

When using the rake, the abutments 23 first engage the ground and the rake teeth can then be forced through the openings formed in the cleaner and into engagement with the ground. As soon as pressure is removed from the handle, the leaf spring will cause the teeth to pass back from the openings 17 to the normal position shown in Figs. 1, 2, and 4 and the cleaner attachment will remove the grass and sticks which may have caught upon the rake teeth. By moving the latch 26 to a locked position the cleaning attachment will be rendered inoperative until the latch is again released.

What is claimed is:

1. A rake comprising a handle, a rake head carried by said handle, a cleaner slidably mounted upon the teeth of said rake head, a tongue forming part of said cleaner head and provided with a slot through which the shank of said rake head passes, strips having their upper end secured to the upper end portion of said tongue and having their free end portion passed through the body portion of said cleaner and bent to form hooked-shaped abutments positioned upon the outer side of said rake head, and a leaf spring carried by said handle and having its free end engaging said cleaner to yieldably hold the same in its normal position.

2. A rake comprising a handle, a rake head having its shank connected with said handle, a cleaner slidably mounted upon the teeth and shank of said rake head and having vertical and horizontal portions, strips having their upper ends secured to the vertical portion of said cleaner and passing through the horizontal portion of said cleaner and having their free end portions bent to form outwardly extending abutments, said rake head extending between said strips and the vertical portion, and means yieldably holding said cleaner in its normal position.

3. A rake comprising a handle, a rake head having its shank connected with said handle, a cleaner slidably connected with said rake head, said cleaner comprising a body portion bent longitudinally to form a horizontal and a vertical flange, a tongue extending upwardly from said vertical flange and provided with a slot through which the shank of said rake head passes, said cleaner being provided with an opening at the junction of said flanges to permit the passage of the teeth of said rake head, strips secured to the upper end portion of said tongue and passing outside of said rake head and through certain of the openings formed in said cleaner and having their free end portions bent to form outwardly-extending abutments, and a leaf spring carried by said handle, the lower end portion of the slot in said tongue being enlarged transversely to permit the free end portion of said leaf spring to pass through the same to engage the horizontal flange of said cleaner.

4. A rake comprising a handle, a rake head carried by said handle, a cleaner slidably mounted upon said rake head and provided with an opening through which the teeth of said rake pass and with a vertically-extending slot through which the shank of said rake head passes, tongues extending from certain of the openings through which the teeth of said rake head pass to assist in cleaning the teeth, abutments carried by said cleaner whereby said cleaner will be moved to an inoperative position upon said rake being brought into engagement with the ground, resilient means for yieldably holding said cleaner in a normal position, and a latch carried by said cleaner for engaging the shank of said rake head for releasably holding said cleaner in an inoperative position.

5. A rake comprising a handle, a rake head connected with said handle, a cleaner strip slidably mounted upon the teeth of said rake head and provided with a tongue extending above the strip and slidably mounted upon the shank of said rake head, and strips connected with the upper portion of the tongue of said cleaning strip and extending downwardly upon the opposite side of the rake head from said tongue beyond said cleaner strip and having their free end portions formed in the abutments engaging the ground to move the cleaner strip toward the upper ends of said teeth, and yieldable means normally holding said cleaner strip adjacent the free ends of said teeth.

In testimony whereof I affix my signature in presence of two witnesses.

JOSEPH F. WIXOM.

Witnesses:
EMMA E. GOLD,
J. F. RICHARDS.